Patented Dec. 19, 1950

2,534,241

UNITED STATES PATENT OFFICE 2,534,241

8-HALOXANTHINE SALTS OF N,N-DIALKYL-N'-ARYL-N'-THENYL-ETHYLENEDIAMINES

John W. Cusic, Skokie, Ill., assignor to G. D. Searle & Co., Chicago, Ill., a corporation of Illinois No Drawing. Application October 25, 1949, Serial No. 123,541

7 Claims. (Cl. 260—253)

This invention relates to 8-haloxanthine salts of N,N - dialkyl - N' - aryl - N' - thenyl - ethylenediamines, and to the production thereof. More particularly this invention relates to 8-haloxanthine salts of organic bases having the following general structural formula

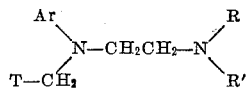

wherein Ar is an aryl radical, T is a thienyl radical, and R and R' are lower alkyl radicals, and wherein the 8-haloxanthine contains a hydrogen atom in position 7.

In the foregoing structural formula Ar represents a lower aryl radical. Among the radicals represented by Ar are phenyl, tolyl, chlorophenyl, bromophenyl, iodophenyl, methoxyphenyl, ethoxyphenyl, xylyl, and related aromatic radicals of the benzene series. T represents a thienyl radical, that is, a radical derived from thiophene or a halogenated thiophene by removal of one hydrogen atom. It therefore includes radicals such as 2-thienyl, 3-thienyl, 5-chloro-2-thienyl, 5-bromo-2-thienyl, 5-chloro-3-thienyl, 5-bromo-3-thienyl, and related radicals. The thienyl radical, when attached to a methylene radical, forms a thienylmethyl or thenyl radical. R represents lower alkyl radicals such as methyl, ethyl, propyl, or butyl.

This application is a continuation-in-part of my copending application Serial No. 71,763, filed January 19, 1949.

It is recognized that N,N-dialkyl-N'-aryl-N'-thenylethylenediamine compounds, which are commonly used as antihistaminic agents, elicit certain undesirable side reactions. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by N,N-dialkyl-N'-aryl-N'-thenylethylenediamines are often severe enough to warrant reduced dosage or discontinuance of the medication.

It is the object of this invention to produce therapeutic compositions of matter which are relatively free from untoward reactions. A further object is to produce compositions of N,N-dialkyl-N'-aryl-N'-thenylethylenediamines and haloxanthines of reduced toxicity. Another object is to produce compositions having enhanced therapeutic efficacy. Other objects will be apparent to those skilled in the art, in view of the disclosure given herein.

I have discovered that salts of N,N-dialkyl-N'-aryl - N' - thenylethylenediamines with haloxanthines produce little effect on the central nervous system and are therapeutically more useful than any of the individual components alone. The salts of N,N-dialkyl-N'-aryl-N'-thenylethylenediamines and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symptoms commonly elicited by the usual antihistaminic drugs. For instance, my compounds can be used to prevent or alleviate nausea, motion sickness, dizziness and other distressing reactions.

Among the halogenated xanthines to which this invention pertains are the chloro, bromo, and iodo derivatives of theophylline, and related xanthines which have a hydrogen atom in the 7 position.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic base are desirable in these synthetic procedures. The desired salt generally crystallizes out of the solution on chilling or standing, or may be precipitated by addition of a solvent such as ether or benzene. A simple and efficient alternative method is that of heating together at 50-100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope.

*Example 1*

9 parts of N,N-dimethyl-N'-phenyl-N'-(2-thienylmethyl)ethylenediamine

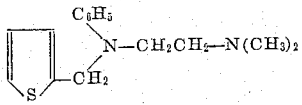

and 7 parts of 8-chlorotheophylline are dissolved in a hot mixture of 40 parts of methyl ethyl ketone and 4 parts of water. The mixture is agitated at approximately boiling temperature until the solid is dissolved. The hot solution is then filtered and evaporated nearly to dryness and the residue is crystallized from ethyl acetate. The crystalline 8-chlorotheophylline salt of N,N - dimethyl - N' - phenyl - N' - (2 - thienylmethyl)ethylenediamine is obtained as a light colored crystalline powder. A sample of this salt on analysis showed 7.23% chlorine. The calculated value is 7.47%.

*Example 2*

7 parts of N,N-dimethyl-N'-phenyl-N'-(2-thienylmethyl)ethylenediamine and 6.5 parts of 8-bromotheophylline are dissolved in 45 parts of boiling methyl ethyl ketone containing 5 parts of water. The boiling solution is filtered and evaporated. The residue of the 8-bromotheophylline salt of N,N-dimethyl-N'-phenyl-N'-(2-thienylmethyl)ethylenediamine is crystallized from ethyl acetate. A sample on analysis showed 15.14% bromine; the calculated value is 14.96%.

I claim:

1. An 8-halotheophylline salt of an organic base of the formula

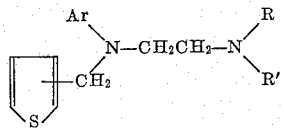

wherein Ar is a phenyl radical, and R and R' are lower alkyl radicals.

2. An 8-haloxanthine salt of an organic base of the formula

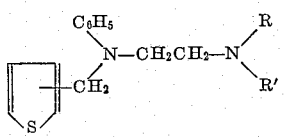

wherein R and R' are lower alkyl radicals, and wherein the 8-haloxanthine contains a hydrogen atom in position 7.

3. An 8-haloxanthine salt of an organic base of the formula

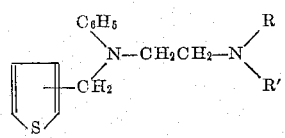

wherein R and R' are lower alkyl radicals, and wherein the 8-haloxanthine contains a hydrogen atom in position 7.

4. An 8-haloxanthine salt of N,N-dimethyl-N'-phenyl - N' - (2 - thienylmethyl - ethylenediamine, wherein the 8-haloxanthine contains a hydrogen atom in position 7.

5. An 8-halotheophylline salt of N,N-dimethyl-N' - phenyl - N' - (2 - thienylmethyl)ethylenediamine.

6. The 8-chlorotheophylline salt of N,N-dimethyl - N' - phenyl - N' - (2 - thienylmethyl)ethylenediamine.

7. The 8-bromothiophylline salt of N,N-dimethyl - N' - phenyl - N' - (2 - thienylmethyl)ethylenediamine.

JOHN W. CUSIC.

No references cited.

Certificate of Correction

Patent No. 2,534,241 December 19, 1950

JOHN W. CUSIC

It is hereby certified that error appears in the printed specification of the above numbered patent requiring correction as follows:

Column 4, lines 27 to 30, for that portion of the formula reading line 34, for "thienylmethyl-" read *thienylmethyl)*; line 44, for "8-bromothiophylline" read *8-bromotheophylline*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*